United States Patent [19]

Cooper et al.

[11] 4,337,284
[45] Jun. 29, 1982

[54] FILM TEAR-TAPE AND PACKAGING FILM HAVING TEAR-TAPE ADHERENT THERETO

[75] Inventors: Gordon Cooper, Hatfield; Patrick S. Bryant, Welwyn Garden City, both of England

[73] Assignee: Imperial Chemical Industries Limited, London, England

[21] Appl. No.: 115,777

[22] Filed: Jan. 28, 1980

Related U.S. Application Data

[63] Continuation of Ser. No. 33,716, Jun. 20, 1979, abandoned.

[30] Foreign Application Priority Data

Feb. 14, 1979 [GB] United Kingdom ............... 7905240

[51] Int. Cl.³ .................. B65D 1/00; A61F 13/02; B32B 27/00
[52] U.S. Cl. ............................... 428/35; 428/40; 428/337; 428/339; 428/349; 428/352; 428/355; 428/515; 428/516; 428/913
[58] Field of Search ............... 428/515, 516, 913, 349, 428/35, 40, 337, 339, 352, 355; 156/334

[56] References Cited

U.S. PATENT DOCUMENTS

| | | | |
|---|---|---|---|
| 4,020,228 | 4/1977 | Eastes | 428/349 X |
| 4,127,688 | 11/1978 | Bieler et al. | 428/515 X |
| 4,132,050 | 1/1979 | Young | 428/516 X |

FOREIGN PATENT DOCUMENTS

| | | |
|---|---|---|
| 1006135 | 9/1965 | United Kingdom . |
| 1044502 | 10/1966 | United Kingdom . |
| 1382120 | 1/1975 | United Kingdom . |

*Primary Examiner*—Thomas J. Herbert, Jr.
*Attorney, Agent, or Firm*—Cushman, Darby & Cushman

[57] ABSTRACT

A tear-tape for attachment to a polymeric packaging film comprises a thermoplastic polymeric substrate having on a surface thereof a layer of a sealing resin comprising a blend of an ethylene-vinyl acetate copolymer and a plasticizer therefor. Bonding between the tear-tape and a polymeric packaging film substrate is enhanced by the presence of the plasticizer.

8 Claims, No Drawings

FILM TEAR-TAPE AND PACKAGING FILM HAVING TEAR-TAPE ADHERENT THERETO

This is a continuation of application Ser. No. 33,716 filed June 20, 1979, now abandoned.

This invention relates to tear-tapes for polymeric packaging films, and, in particular, to a polymeric packaging film having a tear-tape heat-sealed thereto.

Tear-tapes in the form of narrow plastic or foil strips or threads for attachment to the surface of packaging films are well known. Packages formed from such films are opened by pulling the tear-tape at an angle to the plane of the film, thereby excising that part of the film to which the tear-tape is attached. The tape may be attached to the inner or outer surface of the film package, and in each case the bond between the tape and the film is desirably strong. Many proposals have been made for effecting this bond. In particular, tapes coated with a surface layer of a thermally-softenable adhesive material have been employed, thereby enabling a tape to be bonded to a film surface by a simple heat-sealing technique. Examples of such tapes include "prewaxed" tapes coated with a suitable wax such as microcrystalline wax, or with an ethylenic adhesive such as an ethylene-vinyl acetate copolymer. However, because of the relatively inert surface characteristics of polymeric films, the attainment of adequate bond strength without effecting thermal distortion of the film during the heat-sealing operation has proved difficult.

We have now devised a heat-sealable tear-tape which overcomes the aforementioned difficulty.

Accordingly, the present invention provides a tear-tape for attachment to a polymeric packaging film the tape comprising a thermoplastic polymeric substrate having on a surface thereof a layer of a sealing resin comprising a blend of an ethylene-vinyl acetate copolymer and a plasticizer therefor.

The invention further provides a tearable packaging film comprising a polymeric film and a thermoplastic polymeric tear-tape bonded thereto by a thermally cured layer of a sealing resin as hereinbefore defined.

The invention still further provides a tearable package comprising an article wrapped in a polymeric packaging film having a polymeric tear-tape bonded thereto by a thermally cured layer of a sealing resin as hereinbefore defined.

A tear-tape according to the invention is intended for attachment to a packaging film from which a tearable package may be formed by wrapping and sealing the film around an article of commerce. The tape may be attached to a surface of the packaging film by a continuous bond along substantially the entire length of the tape or by intermittent spot welds spaced apart along the tape.

To facilitate opening of the tearable package the tape should be attached to the packaging film so as to extend along at least part of at least one surface of the package formed from the film, and preferably around a complete periphery of the package, thereby to initiate and propagate tearing of the film along and in the vicinity of the tape when the tape is pulled away from or through the surface of the package to which the tape is attached.

Desirably the tape will have a width, in a direction parallel to the plane of the packaging film of from 0.5 to 10, preferably from 2 to 5, millimeters, and a thickness, in a direction normal to the plane of the packaging film, of from 5 to 250, preferably from 20 to 250, and particularly preferably from 30 to 100, microns. The tape may be directly extruded in the appropriate width, or may be formed by slitting larger sheets to the desired width.

Decorative and/or descriptive matter may be printed on, or otherwise applied to, or incorporated in, the tape, and, if desired, the tape may be longitudinally oriented to improve the tensile properties thereof. The tensile strength of the tape may, but need not, exceed that of packaging film.

Thermoplastic polymeric materials suitable for use as tear-tapes according to the invention include polyesters, polycarbonates, polyamides, vinyl chloride polymers, and particularly polyolefins—such as low-density and high-density polyethylene, and homo- and co-polymers of propylene, the latter containing up to 20% by weight of an alpha-mono-olefin containing 2 or from 4 to 10 carbon atoms in its molecule, optionally coated with a heat-sealable polymeric surface layer melting at a temperature below the melting temperature of the polymeric material. Laminates of two or more layers of one or more of these materials, optionally with the inclusion therein of a metallic foil interlayer, may also be employed.

The sealing resin desirably comprises an ethylene-vinyl acetate copolymer containing from 25 to 45 percent by weight of vinyl acetate. However, if the resin is to be applied to the tape substrate as a solution or dispersion in an organic solvent medium the vinyl acetate preferably constitutes from 35 to 42 percent by weight of the copolymer to ensure adequate solubility of the latter in the medium. A particularly preferred resin comprises a copolymer containing ethylene and vinyl acetate copolymerised in a weight ratio of 60:40.

The plasticizer blended with the ethylene-vinyl acetate copolymer sealing resin is suitably any additive which may be incorporated into a polymeric material to improve its processability and flexibility. They are well known per se in the plastics art, particularly for modifying the characteristics of polyvinyl chloride, and are usually organic materials in the form of moderately high molecular weight liquids or low melting solids. Most commonly they comprise esters of carboxylic acids or phosphoric acid, although hydrocarbons, halogenated hydrocarbons, ethers, glycols, polyglycols and hydrogenated or epoxydised drying oils (e.g. soya bean oil) may also be employed. Typical aromatic plasticizers include phosphoric esters such as triphenyl phosphate, and phthalic esters such as dibutyl phthalate or dicyclohexyl phthalate, while aliphatic plasticizers include adipic esters such as diisooctyl adipate, azelaic esters such as di(2-ethylhexyl)azelate, sebacic esters such as dioctyl sebacate, and citric esters such as acetyl tributyl citrate.

The amount of plasticizer to be blended with the ethylene-vinyl acetate copolymer resin to provide the desired degree of adhesion between the tear-tape and packaging film to which the tape is sealed may vary over a wide range but is readily established by simple experimentation. Conveniently the plasticizer comprises from 1 to 50, preferably from 2 to 30, and particularly preferably from 5 to 25, percent by weight of the copolymer resin.

If desired the copolymer sealing resin may, in addition to the plasticizer, include one or more conventional additives such as a low melting point wax, a tackifier resin, or an inert filler such as talc, clay, silica, barytes or titania.

The resin blend may be applied to the tear-tape as a melt blend or as a solution or dispersion in a volatile organic medium, such as toluene, xylene, benzene or ethyl acetate. In the latter case the organic medium is evaporated either at ambient temperature or in a suitably heated air-oven. The amount of resin blend applied to the tape to achieve acceptable performance is readily established by simple experimentation. In practice, a dry coat weight of from 0.25 to 15, preferably from 0.5 to 10, and particularly preferably from 1 to 7.5 g/m², is generally satisfactory.

Application of the copolymer resin solution to the tear-tape, or to a wide film subsequently to be slit into independent tear-tapes, is effected by conventional coating techniques—for example by a gravure roller coater, or manually by a wire-wound rod such as a K-bar.

Packaging films to which tear-tapes are suitably applied in accordance with the invention include films of a polyester, such as polyethylene terephthalate, and particularly films of polyolefins—such as low- and high-density polyethylene, polypropylene, polybutene-1, and poly-4-methylpentene-1. A particularly suitable film is formed from a high molecular weight stereoregular predominantly crystalline polymer of propylene, either in the form of a homopolymer or copolymerised with minor quantities (e.g. up to 15% by weight of the copolymer) of other unsaturated monomers such as ethylene. A film of this kind is desirably provided (prior to application of the tear-tape) with a polymeric heat-sealable surface coating, such as a vinylidene chloride-acrylonitrile copolymer or a co- or ter-polymer of two or more alpha-mono-olefins containing from 2 to 10 carbon atoms in the molecule. Another preferred film is a multiple-layer film, such as a polypropylene substrate having on at least one surface thereof a layer of either a copolymer of propylene (80–95% by weight) with an alpha-olefin containing from 4 to 10 carbon atoms in its molecule (preferably butene-1) as disclosed in British patent No. 1 452 424, or a blend of said propylene-alpha-olefin copolymer with from 25 to 95% by weight of the blend of a polymer of an alpha-olefin containing from 4 to 10 carbon atoms in its molecule, such as butene-1, compolymerised with from 0 to 10% by weight of the copolymer of an alpha-olefin containing from 2 to 10 carbon atoms in its molecule as described in British patent No. 1 495 776.

Packaging films for use in the invention are made by conventional techniques, particularly by the established tubular or "bubble" process, are preferably biaxially oriented (and heat-set), may contain conventional additives, such as slip aids and anti-static agents, and may be subjected to conventional after-treatments—for example, exposure to corona discharge treatment to improve the bonding and print-receptive characteristics of the film surface.

Films having a thickness of from 2 to 150 microns are of general utility in packaging applications, those within a thickness range of from 10 to 50 microns being particularly suitable for the packaging of small objects, such as cigarette packets, biscuit cartons, and the like.

Adhesion of the resin-coated tear-tape to a substrate packaging film is effected by standard heat-sealing techniques—for example, a tear-tape may be supplied in the form of a ribbon to the rim of a heated wheel which cooperates with the film surface and applies sufficient pressure to weld the ribbon thereto.

To determine the heat-seal strength of the adhesive bond, a strip of tear-tape film is positioned with its resin-coated surface in contact with the surface of a polymeric packaging film strip, and the two strips are sealed together between the jaws of a Sentinel heat-sealer, Model No. 12AS (1.0 sec; 100° C.; 5 psi/3515 kgm$^{-2}$), only one jaw of the unit being heated. The strength of the seal is measured by cutting from the sealed-together strips of film, which have been allowed to cool to ambient temperature, a strip 25 mm wide and some 100 mm long, the heat-seal extending across the entire width of the strip and having an area of some 25×25 mm. The unsealed ends of the strip are then attached respectively to a dynamometer and a gripping surface, a load is applied to the gripping surface, and the minimum load required to separate the strips in the sealed area is recorded by the dynamometer, and expressed as a seal strength of x g/25 mm, where x is the load in grammes.

The invention is illustrated by reference to the following Examples.

EXAMPLE 1

To a 20 weight % solids solution of an ethylene-vinyl acetate copolymer resin (vinyl acetate content approximately 40% by weight) in a mixture of toluene and ethyl acetate was added dibutyl phthalate, as plasticizer, at a concentration of 10% by weight of the copolymer solids. The resultant solution of the resin-plasticizer blend was applied by means of a K-bar, wire-wound rod, to a polypropylene-based tear-tape film of 30 microns thickness in an amount such that after drying at a temperature of 60° C. for one minute a resin coating having a weight of approximately 2 g/m² remained on the tape surface.

The tape was then placed with its coated surface in contact with the surface layer of a 20 microns thick multiple-layer film, having a polypropylene substrate and a surface layer of a heat-sealable propylene-alpha-olefin copolymer blend, as described in British patent No. 1 495 776, and heat-sealed thereto (1.0 sec; 100° C.; 5 psi/3515 kgm$^{-2}$).

The heat-seal strength of the bond between the tape and film, measured as hereinbefore described, was 248 g/25 mm.

EXAMPLE 2

This is a comparative Example not according to the invention.

The procedure of Example 1 was repeated except that the plasticizer was omitted from the ethylene-vinyl acetate copolymer resin applied to the tear-tape film.

Heat-seal strength, determined as in Example 1, was only 14 g/25 mm.

EXAMPLE 3

To a 20 weight % solid solution of an ethylene-vinyl acetate copolymer resin (vinyl acetate content approximately 40% by weight) in a mixture of toluene and ethyl acetate was added dibutyl phthalate, as plasticizer, at a concentration of 3% by weight of the copolymer solids. The resultant solution of the resin-plasticizer blend was applied by means of a K-bar, wire-wound rod, to the surface layer of a composite tear-tape film of 28 microns thickness, comprising a polypropylene substrate having an adherent surface layer of a vinylidene chloride-acrylonitrile copolymer (88:12 by weight), the blend being applied in an amount such that after drying at a temperature of 70° C. for 30 seconds a resin coating having a weight of approximately 3 g/m² remained on the tape surface.

The tape was then placed with its blend-coated surface in contact with the surface layer of a 22 microns thick multiple-layer packaging film, having a polypropylene substrate and a surface layer of a heat-sealable propylene-alpha-olefin copolymer blend, as described in British patent No. 1 495 776, and heat-sealed thereto (1.0 sec; 100° C.; 5 psi/3515 kgm⁻²).

The heat-seal strength of the bond between the tape and film, measured as hereinbefore described, was 148 g/25 mm.

EXAMPLE 4

This is a comparative Example not according to the invention.

The procedure of Example 3 was repeated except that the plasticizer was omitted from the ethylene-vinyl acetate copolymer resin applied to the tear-tape film.

Heat-seal strength, determined as in Example 3, was 66 g/25 mm.

EXAMPLES 5 to 9

The procedure of Example 3 was repeated save that the amount and nature of the plasticizer were varied as recorded in the following Table:

| Example | Plasticizer Type | Concentration wt % of resin solids | Heat-seal strength g/25 mm |
|---|---|---|---|
| 5 | dibutyl phthalate | 5 | 107 |
| 6 | dibutyl phthalate | 7 | 101 |
| 7 | diisooctyladipate | 5 | 169 |
| 8 | epoxydised soya bean oil* | 5 | 139 |
| 9 | acetyl tributyl citrate** | 5 | 105 |
| Control (Ex. 4) | None | None | 66 |

*'Reoplast' 39
**'Citroflex' A4

EXAMPLE 10

The procedure of Example 5 was repeated save that the ethylene-vinyl acetate resin containing 5% by weight of dibutyl phthalate as plasticizer was applied to a polyethylene terephthalate tear-tape film.

The measured heat-seal strength of the bond between the tape and multiple-layer packaging film, as described in Example 5, was 84 g/25 mm.

We claim:

1. A tear-tape for attachment of a polymeric packaging film the tape comprising a thermoplastic polymeric substrate tape having a width of from 0.5 to 10 millimeters and a thickness of from 5 to 250 microns and having on a surface thereof a layer of a sealing resin comprising a blend of an ethylene-vinyl acetate copolymer and a plasticizer therefor, the plasticizer comprising from 2 to 30 percent by weight of the sealing resin.

2. A tear-tape according to claim 1 wherein the substrate is of a polyolefin selected from the group consisting of low density polyethylene, high density polyethylene, a propylene homopolymer and a copolymer of propylene with up to 20% by weight of the copolymer of an alpha-mono-olefin containing 2 or from 4 to 10 carbon atoms in its molecule.

3. A tear-tape according to claim 1 wherein the substrate is an oriented film.

4. A tear-tape according to claim 1 wherein the sealing resin contains from 25 to 45 weight percent of vinyl acetate.

5. A tear-tape according to claim 1 wherein the plasticizer is an ester selected from the group consisting of an aromatic ester and an aliphatic ester.

6. A tearable packaging film comprising a polymeric packaging film and a thermoplastic polymeric tear-tape bonded thereto by a thermally curved layer of a sealing resin comprising a blend of an ethylene-vinyl acetate copolymer and a plasticizer therefor, the plasticizer comprising from 2 to 30 percent by weight of the sealing resin and the tape having a width of from 0.5 to 10 millimeters and a thickness of from 5 to 250 microns.

7. A tearable packaging film according to claim 6 wherein the polymeric packaging film is a polyolefin film.

8. A tearable package comprising an article wrapped in a tearable packaging film as defined in claim 6.

* * * * *

UNITED STATES PATENT AND TRADEMARK OFFICE
CERTIFICATE OF CORRECTION

PATENT NO. : 4,337,284
DATED : June 29, 1982
INVENTOR(S) : Gordon Cooper and Patrick Samuel Bryant It is certified that error appears in the above—identified patent and that said Letters Patent is hereby corrected as shown below:

On front page format paragraph [63] "Continuation" should read --Continuation-in-part--.

Column 1, lines 1-2 - For "continuation" read --continuation-in-part--.

Claim 6, line 3, for "curved" read --cured--.

Signed and Sealed this

Thirty-first Day of May 1983

[SEAL]

Attest:

DONALD J. QUIGG

Attesting Officer     Acting Commissioner of Patents and Trademarks